United States Patent
Kim et al.

(10) Patent No.: US 7,724,191 B2
(45) Date of Patent: May 25, 2010

(54) APPARATUS AND METHOD FOR TRACING POSITION AND DIRECTION OF TARGET OBJECT THROUGH RF SIGNAL

(75) Inventors: Myung Sik Kim, Ishikawa (JP); Nak Young Chong, Ishikawa (JP); Hyung Wook Kim, Ishikawa (JP)

(73) Assignee: Electronics And Telecommunications Research Institute, Daejeon (KR)

( * ) Notice: Subject to any disclaimer, the term of this patent is extended or adjusted under 35 U.S.C. 154(b) by 133 days.

(21) Appl. No.: 11/870,645

(22) Filed: Oct. 11, 2007

(65) Prior Publication Data

US 2008/0224917 A1 Sep. 18, 2008

(30) Foreign Application Priority Data

Mar. 14, 2007 (KR) .................... 10-2007-0025034

(51) Int. Cl.
*G01S 13/06* (2006.01)
(52) U.S. Cl. ....................... 342/448; 342/432
(58) Field of Classification Search ......... 342/432–437, 342/448

See application file for complete search history.

(56) References Cited

U.S. PATENT DOCUMENTS

| 1,525,177 | A | * | 2/1925 | Goldschmidt et al. | 342/448 |
| 1,898,488 | A | * | 2/1933 | Kaess | 342/448 |
| 2,282,402 | A | * | 5/1942 | Hefele | 342/437 |
| 2,379,909 | A | * | 7/1945 | Kilpatrick | 342/432 |
| 2,384,317 | A | * | 9/1945 | Lear | 342/448 |
| 3,135,958 | A | * | 6/1964 | Schwartz | 342/442 |
| 3,665,476 | A | * | 5/1972 | Taylor | 343/701 |
| 4,673,921 | A | * | 6/1987 | Saito et al. | 340/539.32 |
| 4,724,442 | A | * | 2/1988 | King | 342/434 |
| 4,954,836 | A | | 9/1990 | Sakuma | |
| 2003/0218569 | A1 | * | 11/2003 | Akazawa et al. | 342/430 |

FOREIGN PATENT DOCUMENTS

| JP | 57-28270 A | 2/1982 |
| KR | 1019930011588 B1 | 12/1993 |
| KR | 1020030075273 A | 9/2003 |
| KR | 1020030091310 A | 12/2003 |
| KR | 1020060091836 | 8/2006 |

OTHER PUBLICATIONS

Myungsik Kim, et al; "RFID Based Target Acquisition and Docking System for Indoor Mobile Robots;" The 3rd International Conference on Ubiquitous Robots and Ambient Intelligence (URAI 2006), pp. 231-235.

* cited by examiner

*Primary Examiner*—Thomas H Tarcza
*Assistant Examiner*—Fred H Mull
(74) *Attorney, Agent, or Firm*—Ladas & Parry LLP

(57) ABSTRACT

An apparatus for tracing position and direction of a target object through an RF signal includes two loop antennas and a position and direction determination part. The two loop antennas receive the RF signal transmitted from the target object and are perpendicularly coupled to each other. The position and direction determination part calculates two RF signal intensities received through the respective two loop antennas for comparison, and then determines that the target object transmitting an RF signal is placed in a center direction between the two loop antennas if the two RF signal intensities are the same, and otherwise determines that the target object is placed in a front direction of the loop antenna having a relatively higher RF signal intensity.

9 Claims, 6 Drawing Sheets

APPARATUS AND METHOD FOR TRACING POSITION AND DIRECTION OF TARGET OBJECT THROUGH RF SIGNAL

CROSS-REFERENCE TO RELATED APPLICATIONS

This application claims the priority of Korean Patent Application No. 10-2007-0025034, filed on Mar. 14, 2007, in the Korean Intellectual Property Office, the disclosure of which is incorporated herein by reference.

BACKGROUND OF THE INVENTION

1. Field of the Invention

The present invention relates to an apparatus and a method for tracing position and direction of a target object, and more particularly, to an apparatus and a method for tracing position and direction of a target object through a radio frequency (RF) signal.

This work was supported by the IT R&D program of MIC/IITA [2005-S-092-02, USN-based Ubiquitous Robotic Space Technology Development]

2. Description of the Related Art

In general, an apparatus for tracing position and direction of a target object has been studied in various fields to provide more services to human life, and its technical development is being already in great progress.

One of its examples is the global positioning system (GPS). Developed by the United States Department of Defense, the GPS utilizes a constellation of earth orbit satellites that transmit precise microwave signals, and thus enables a GPS receiver to determine its location, speed/direction and time.

However, the GPS basically includes various operative errors, and the operative errors increase due to a variety of factors such as arrangements of satellites, weather conditions, buildings, and forests, which may affect a GPS signal reception. Most importantly, The GPS may not be feasible indoors because there are limitations in receiving a GPS signal.

Another example is a position tracking system utilizing a camera image. This stores an image of an already-known object in advance, and compares and matches the stored object image with an image that is obtained through a camera in order to search for a corresponding object, such that its existence and direction can be achieved.

However, this position tracking system is extremely sensitive to a lighting change. As a result, this may have a limitation in searching for a target object, because it is difficult to recognize direction, position, and a size change of the target object in a dark environment.

Furthermore, as circumstances require, the position tracking system may utilize a moving speed of a sound source, and also may place sound source sensors in a circular disposition by using a center axis as a reference line. Then, the position tracking system determines that the target object is disposed close to the one sound source sensor that first detects the sound source of the target object among the sound source sensors. However, this position tracking system is especially sensitive to surrounding noise because of its operating property that utilizes a sound source, and thus may not be appropriately functioned in general environments.

Reliability and performance of the position tracking system may vary according to surrounding environments.

SUMMARY OF THE INVENTION

An aspect of the present invention provides an apparatus and a method for tracing position and direction of a target object with an RF signal transceiver, such that easier tracing can be achieved with the minimum influence of surrounding environments.

According to an aspect of the present invention, there is provided an apparatus for tracing position and direction of a target object through a radio frequency (RF) signal, the apparatus including: an antenna rotating and receiving an RF signal transmitted from the target object; and a position and direction determination part calculating an intensity of the received RF signal and determining that the target object is placed in front of the antenna when the RF signal intensity reaches the maximum.

According to another aspect of the present invention, there is provided an apparatus for tracing position and direction of a target object through an RF signal, the apparatus including: two loop antennas receiving the RF signal transmitted from the target object and coupled perpendicularly to each other; and a position and direction determination part calculating two RF signal intensities received through the respective two loop antennas for comparison, and then determining that the target object transmitting an RF signal is placed in a center direction between the two loop antennas if the two RF signal intensities are the same, and otherwise determining that the target object is placed in a front direction of the loop antenna having a relatively higher RF signal intensity.

According to another aspect of the present invention, there is provided a method for tracing position and direction of a target object through an RF signal, the method including: rotating an antenna to receive an RF signal transmitted from the target object; calculating an intensity of the RF signal; and monitoring a fluctuation of the RF signal intensity and determining that the target object transmitting the RF signal is placed in front of the antenna when the RF signal intensity reaches the maximum.

According to another aspect of the present invention, there is provided a method for tracing position and direction of a target object through an RF signal, the method including: receiving an RF signal transmitted from the target object through two perpendicularly-coupled antennas; calculating an intensity of the RF signal received through the respective two antennas; and comparing the two RF signal intensities to determine that the target object transmitting the RF signal is placed in a center direction between the two loop antennas if the two RF signal intensities are the same, and otherwise determine that the target object is placed in a front direction of the loop antenna having a relatively higher RF signal intensity.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

Figure 1:
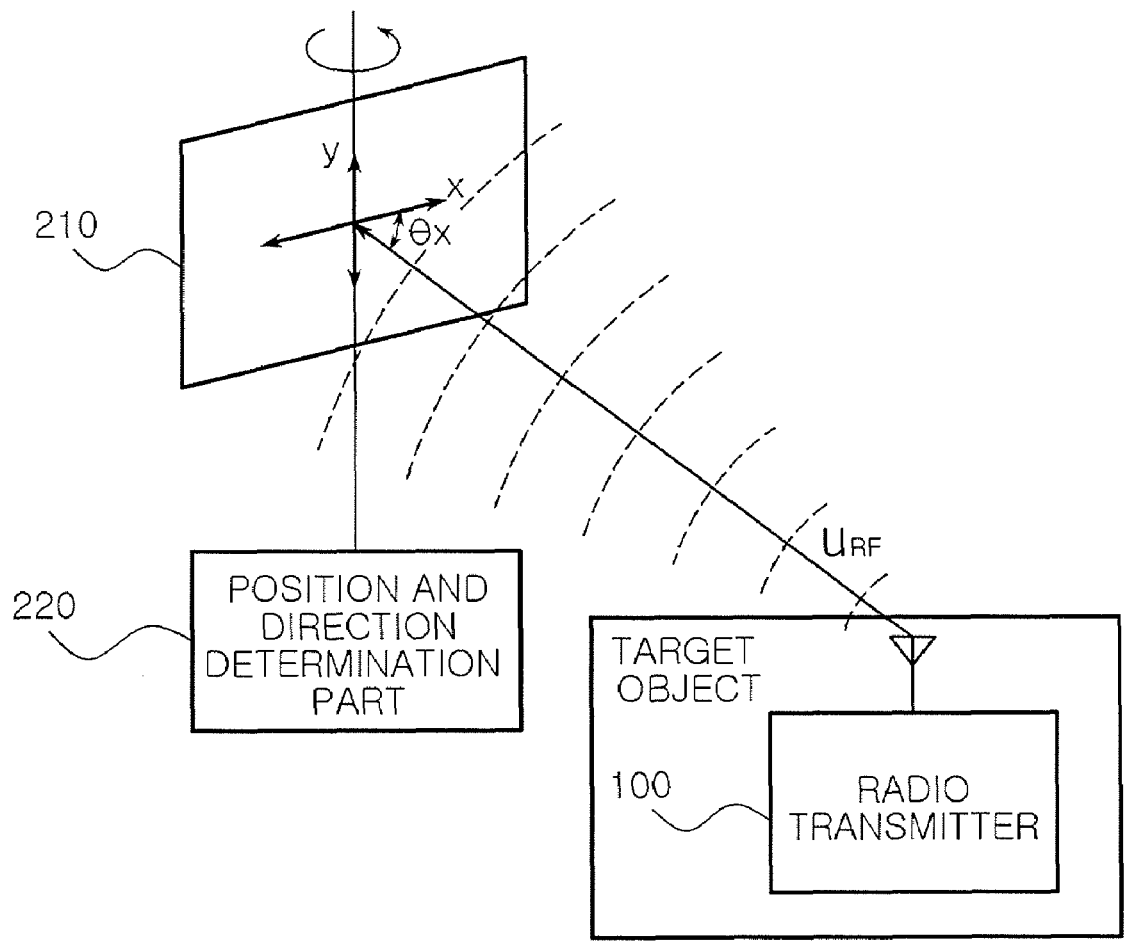
FIG. 1 is a view of an apparatus for tracing position and direction of an RF transceiver according to one embodiment of the present invention.

Preferred embodiments of the present invention will be described below in more detail with reference to the accompanying drawings. The present invention may, however, be embodied in different forms and should not be constructed as limited to the embodiments set forth herein. Rather, these embodiments are provided so that this disclosure will be thorough and complete, and will fully convey the scope of the present invention to those skilled in the art.

Accordingly, in some embodiments, well-known processes, well-known device structures, and well-known techniques will not be described in detail to avoid ambiguous interpretation of the present invention. Like reference numerals refer to like elements throughout.

FIG. 1 is a view of an apparatus for tracing position and direction of an RF transceiver according to one embodiment of the present invention.

Referring to FIG. 1, the apparatus for tracing position and direction of an RF transceiver has a plate-shaped and rotatable loop antenna 210, and a position and direction determination part 220. The position and direction determination part 220 monitors a fluctuation of an RF signal intensity measured through the loop antenna 210 and determines that a target object is placed in front of the loop antenna 210 when the RF signal intensity reaches the maximum value.

The target object may be all kinds of objects that include a radio transmitter 100 to generate an RF signal with a predetermined intensity.

When the radio transmitter 100 of the target object transmits the RF signal with a predetermined intensity, the loop antenna 210 rotates and receives the RF signal. According to an angle θx between an x-axis x of the loop antenna 210 and a transmission direction $U_{RF}$ of the RF signal, magnetic flux of the RF signal passing through a coil in the loop antenna 210 changes, forming a predetermined pattern. Consequently, an intensity of the RF signal, i.e., an induced electromotive force generated by the RF signal, changes, forming a predetermined pattern.

Figure 2A:
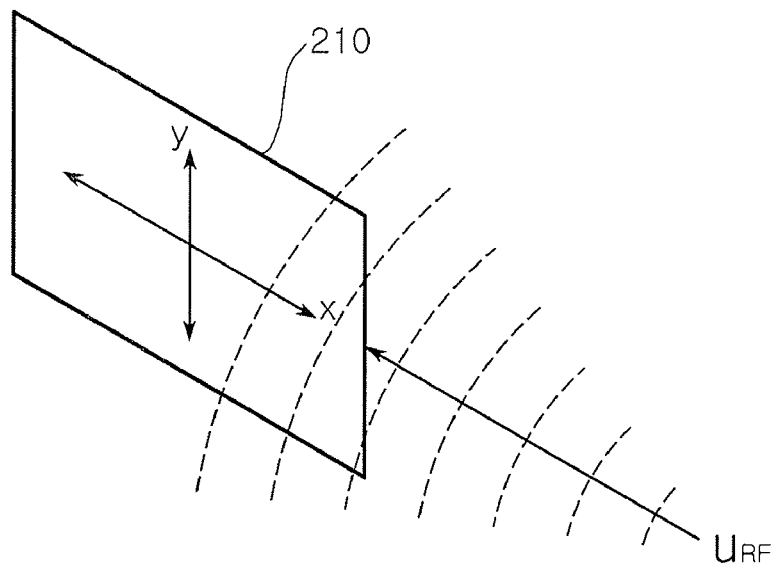
FIGS. 2A and 2B are views illustrating an RF signal receiving area of a loop antenna of FIG. 1, which changes according to a change in an angle between an x-axis of the loop antenna and a transmission direction of an RF signal.
Figure 2B:
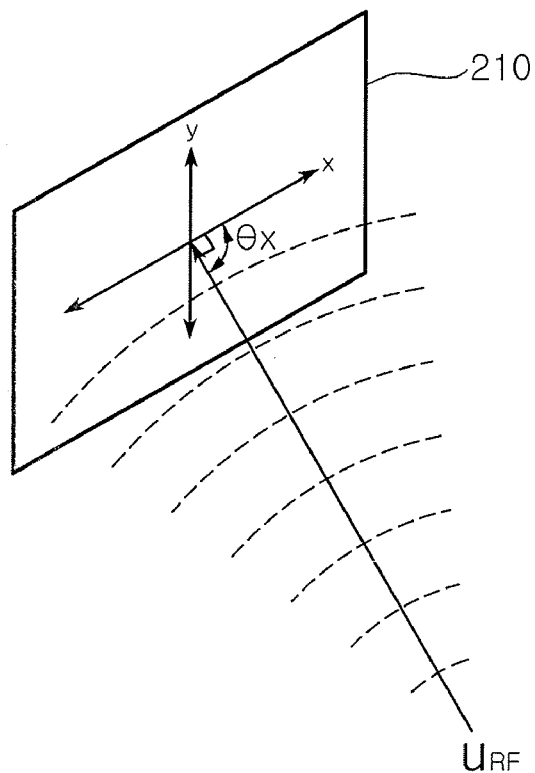
Figure 3:
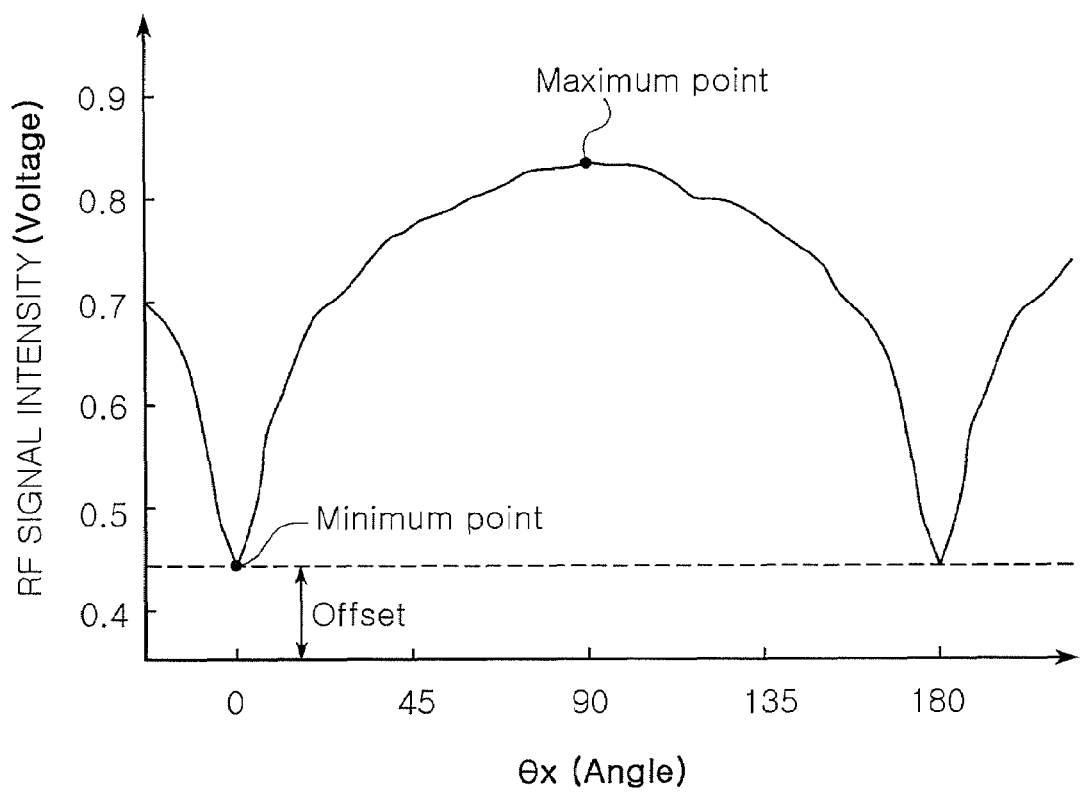
FIG. 3 is a graph illustrating an RF signal intensity, which changes according to a change in an angle between an x-axis of a loop antenna and a transmission direction of an RF signal.

For example, as illustrated in FIG. 2A, if the angle $θ_x$ between the x-axis x of the loop antenna 210 and the transmission direction $U_{RF}$ of the RF signal is 0° or 180°, the loop antenna 210 may receive almost no RF signal. Therefore, as illustrated in FIG. 3, the loop antenna 200 generates the minimum point. Contrarily, as illustrated in FIG. 2B, if the angle $θ_x$ between the x-axis x of the loop antenna 210 and the transmission direction $U_{RF}$ of the RF signal is 90°, the loop antenna 210 receives most of the RF signal. Therefore, as illustrated in FIG. 3, the loop antenna 200 generates the maximum point.

This is because the area S of the loop antenna 210 receiving the RF signal while rotating varies in proportion to S × sin(θ), the position and direction determination part 220 takes this into consideration, and calculates an RF signal intensity V according to Equation 1.

$$V \propto CSB|\sin(θx)| \quad \text{Equation 1}$$

where C, S, and B represent a constant of a loop antenna, the size of the loop antenna, and electric flux density of an RF signal passing through the loop antenna, respectively, and $θ_x$ represents an angle between an x-axis of the loop antenna and a transmission direction of the RF signal.

The position and direction determination part 220 monitors a fluctuation of the calculated RF signal intensity V, and determines that a target object with the radio transmitter 100 is placed in front of the loop antenna 210 when the RF signal intensity V reaches the maximum.

Figure 4:
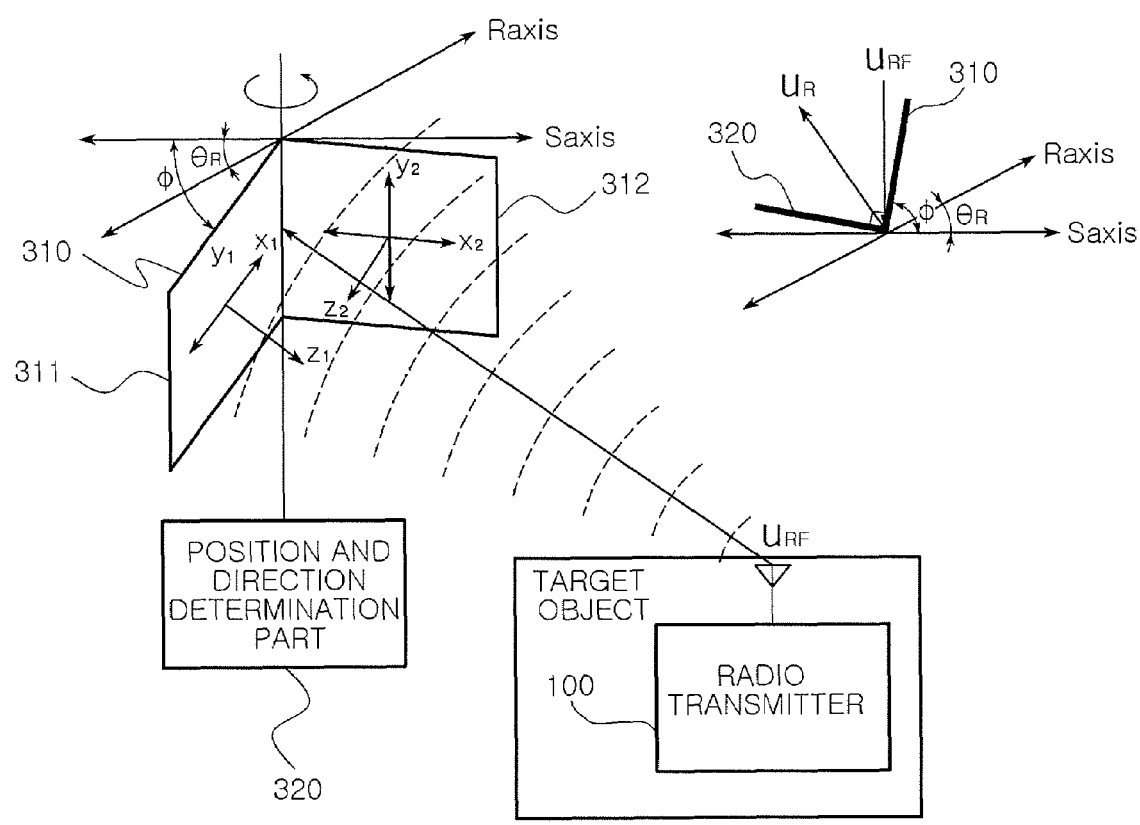
FIG. 4 is a view of an apparatus for tracing position and direction of an RF transceiver according to another embodiment of the present invention.

FIG. 4 is a view of an apparatus for tracing position and direction of a target object according to another embodiment of the present invention.

Referring to FIG. 4, the apparatus for tracing position and direction of a target object includes two loop antennas 311 and 312 and a position and direction determination part 320. The two loop antennas 311 and 312 have a plate shape and are perpendicularly coupled to each other. The position and direction determination part 320 calculates two RF signal intensities $V_1$ and $V_2$ by receiving RF signals through the respective loop antennas 311 and 312 for comparison. Then, the position and direction determination part 320 determines that a radio transmitter 100 transmitting an RF signal is placed in a center direction $U_c$ between the two loop antennas 311 and 312 if the two RF signal intensities $V_1$ and $V_2$ are the same, and otherwise determines that the radio transmitter 100 is placed in a front direction $Z_1$ or $Z_2$ of one of the loop antennas 311 and 312, which has a relatively higher RF signal intensity.

Here, a reference axis Saxis is set perpendicular to the transmission direction of the RF signal, and a rotation axis Raxis is set at an identical angel with respect to the two loop antennas 311 and 312.

When the radio transmitter 100 of the target object transmits an RF signal with a predetermined intensity, the RF signal intensities received through the respective two loop antennas 311 and 312 varies according to an angle $θ_R$ of the rotation axis Raxis with respect to the reference axis Saxis.

Figure 5A:
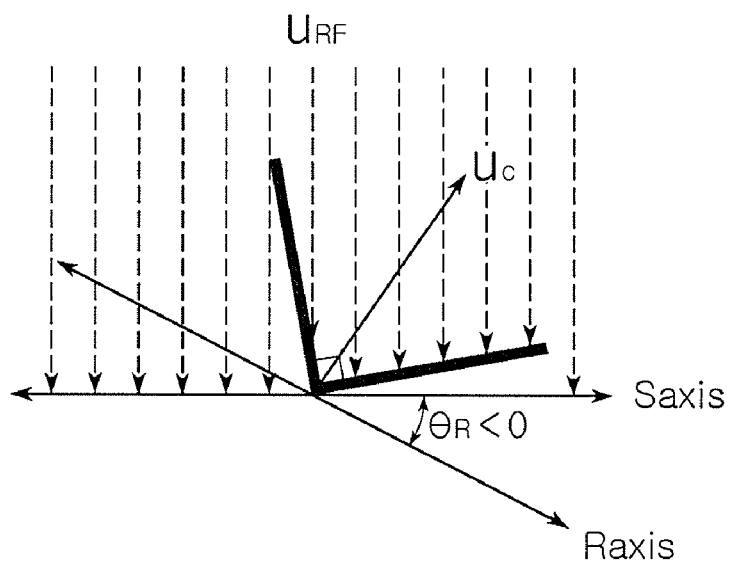
FIGS. 5A through 5C are views illustrating an RF signal receiving area of a loop antenna of FIG. 4, which changes according to a change in an angle between a reference axis and a rotation axis of the loop antenna.
Figure 5B:
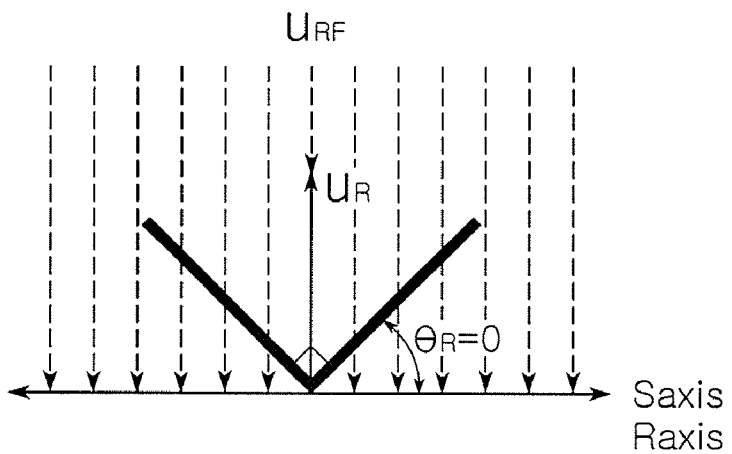
Figure 5C:
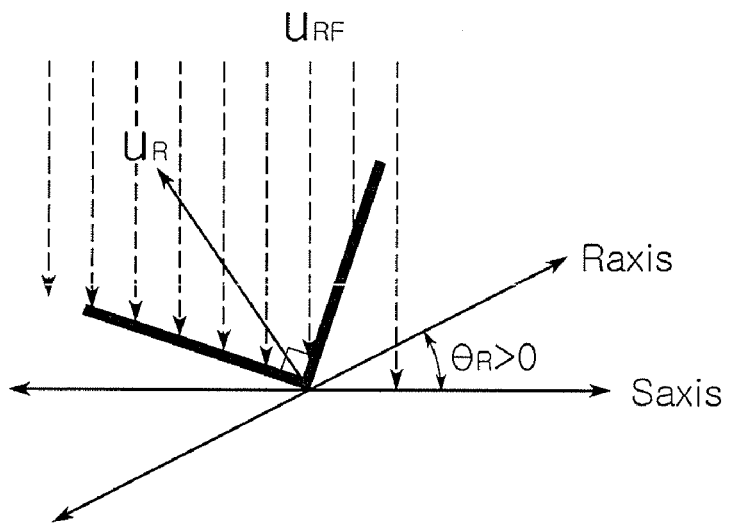

For example, as illustrated in FIG. 5A, if $θ_R$ is less than 0°, the first loop antenna 311 receives an RF signal through its area larger than that of the second loop antenna 312. As illustrated in FIG. 5B, if $θ_R$ is 0°, the first and second loop antennas 311 and 312 receive an RF signal through the same area. As illustrated in FIG. 5C, if $θ_R$ is more than 0°, the second loop antenna 312 receives an RF signal through its area larger than that of the first loop antenna 311.

Accordingly, the position and direction determination part 320 calculates two RF signal intensities $V_1$ and $V_2$ by using Equation 2, which vary according to an angle $θ_R$ of the rotation axis Raxis.

$$V_1 \propto C_1 S_1 B_1 |\sin(θ_R - \phi)|$$

$$V_2 \propto C_2 S_2 B_2 |\sin(90° - (θ_R - \phi))| \quad \text{Equation 2}$$

where $C_1$ and $C_2$ represent a constant of the first loop antenna 311 and a constant of the second loop antenna 312, respectively, $S_1$ and $S_2$ represent the size of the first loop antenna 311 and the size of the second loop antenna 312, respectively, $B_1$ represents electric flux density passing through the first loop antenna 311, $B_2$ represents electric flux density passing through the second loop antenna 312, $θ_R$ represents an angle of a rotation axis Raxis with respect to a reference axis Saxis, and $\phi$ represents an angle of the first loop antenna 311 with respect to the reference axis Saxis.

The position and direction determination part 320 calculates an RF signal intensity ratio $V_{1,2}$ through Equation 3 and analyzes the calculated result to locate the target object with the radio transmitter 100.

$$V_{1,2} \propto \frac{V_1}{V_2} = |\tan(\theta - \phi)| \qquad \text{Equation 3}$$

That is, the position and direction determination part 320 determines that the radio transmitter 100 is placed in a center direction $U_c$ between the two loop antennas 311 and 312 if the RF signal intensity ratio $V_{1,2}$ is 1, determines that the radio transmitter 100 is placed in a front direction $Z_1$ of the first loop antenna 311 if the RF signal intensity ratio $V_{1,2}$ is more than 1, and determines that the radio transmitter 100 is placed in a front direction $Z_2$ of the second loop antenna 312 if the RF signal intensity ratio $V_{1,2}$ is less than 1.

If necessary, the position and direction determination part 320 calculates an angle $\phi$ of the first loop antenna 311 with respect to the reference axis Saxis through Equation 4, and directly determines that the radio transmitter 100 is placed on the position of $\phi+45°$.

$$\phi = \tan^{-1}(V_{1,2}) - \theta \qquad \text{Equation 4}$$

Figure 6A:
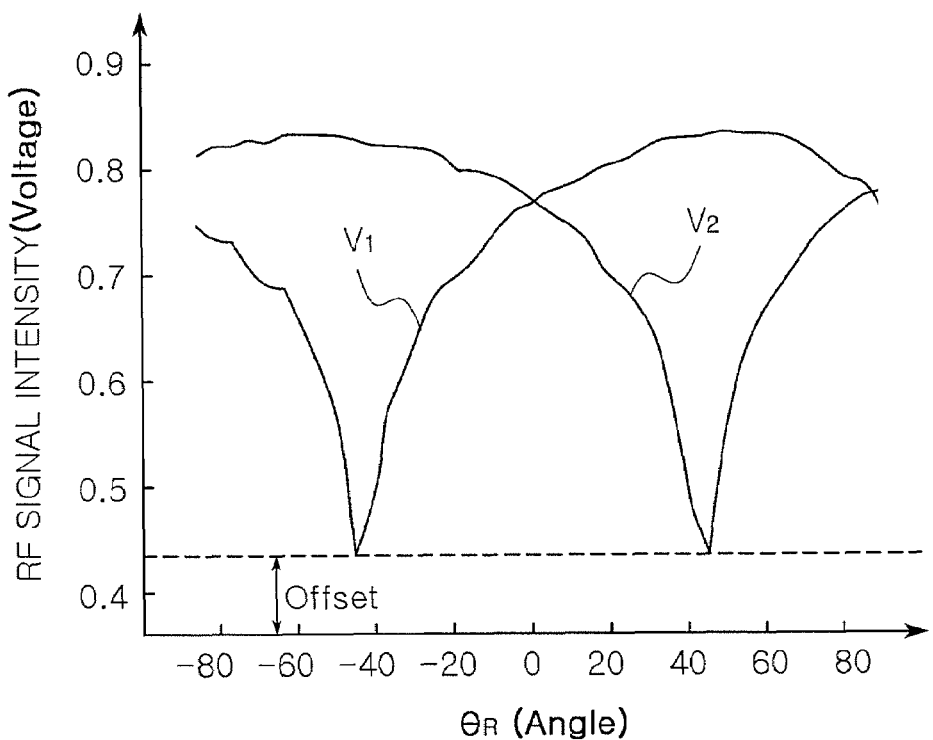
FIGS. 6A and 6B are graphs illustrating an RF signal intensity, which changes according to an angular variation between a reference axis and a rotation axis of a loop antenna of FIG. 4.
Figure 6B:
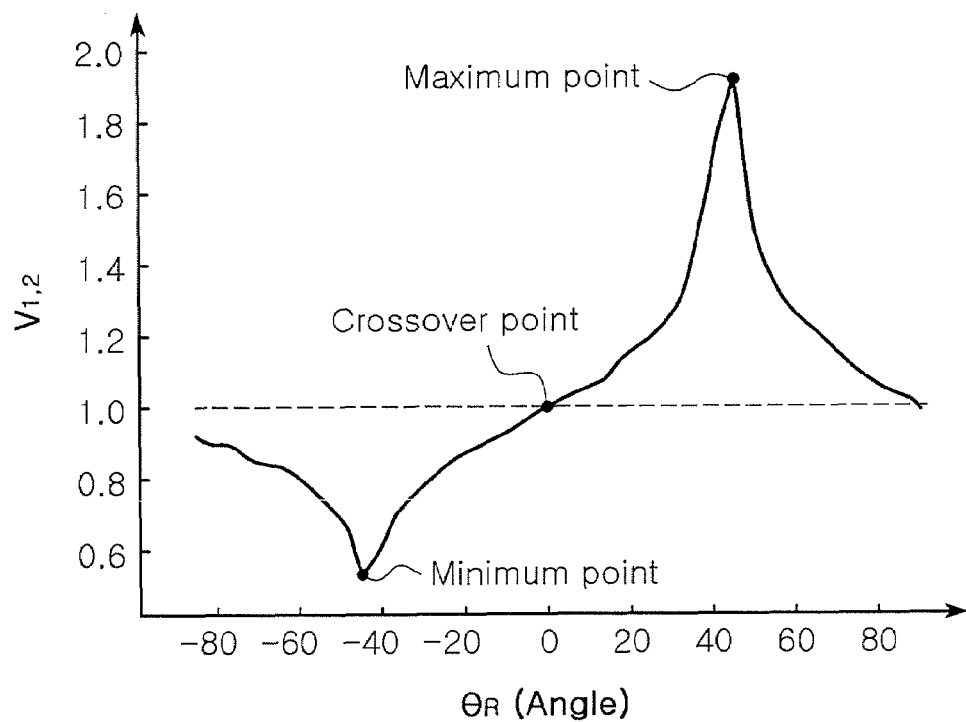

FIGS. 6A and 6B are graphs illustrating an RF signal intensity and an RF signal intensity ratio $V_{1,2}$, which change according to a change in an angle $\theta_R$ between the reference axis Saxis and the rotation axis Raxis of a loop antenna of FIG. 4.

First, if an angle OR between the reference axis Saxis and the rotation axis Raxis is less than 0°, the first loop antenna 311 receives an RF signal through an area larger than that of the second loop antenna 312.

Accordingly, since the first RF signal intensity $V_1$ becomes greater than the second RF signal intensity $V_2$ as illustrated in FIG. 6A, the RF signal intensity ratio $V_{1,2}$ becomes more than 1.

Contrarily, if an angle $\theta_R$ between the reference axis Saxis and the rotation axis Raxis is more than 0, the second loop antenna 312 receives an RF signal through its area larger than that of the first loop antenna 311. Since the first RF signal intensity $V_1$ becomes greater than the second RF signal intensity $V_2$ as illustrated in FIG. 6A, the RF signal intensity ratio $V_{1,2}$ becomes less than 1.

If the reference axis Saxis and the rotation axis Raxis overlap each other and thus the angle $\theta_R$ of the rotation axis with respect to the reference axis is 0°, the first RF signal intensity $V_1$ and the second RF signal intensity $V_2$ become the same because the first loop antenna 311 and the second loop antenna receive an RF signal through the same size. Consequently, the RF signal intensity ratio $V_{1,2}$ becomes 1.

The position and direction determination part 320 utilizes the RF signal intensity ratio $V_{1,2}$ to locate the target object with the radio transmitter 100.

The apparatus for tracing position and direction of a target object through an RF signal analyzes a signal intensity change pattern of the RF signal without the influence of surrounding environments and locates position and direction of the target object. Therefore, the target object can be easily located with the minimum influence of surrounding environment.

While the present invention has been shown and described in connection with the exemplary embodiments, it will be apparent to those skilled in the art that modifications and variations can be made without departing from the spirit and scope of the invention as defined by the appended claims.

What is claimed is:

1. An apparatus for tracing position and direction of a target object through a radio frequency (RF) signal, the apparatus comprising:
   an antenna rotating to receive an RF signal transmitted from the target object; and
   a position and direction determination part calculating an intensity of the received RF signal and determining that the target object is placed in front of the antenna when the RF signal intensity reaches the maximum,
   wherein the antenna is a plate-shaped loop antenna,
   wherein the position and direction determination part calculates the received RF signal intensity V according to Equation below.

$$V \propto CSB|\sin(\theta x)|$$

where C, S, and B represent a constant of a loop antenna, the size of the loop antenna, and electric flux density of an RF signal passing through the loop antenna, respectively, and $\theta x$ represents an angle between an x-axis of the loop antenna and a transmission direction of the RF signal.

2. An apparatus for tracing position and direction of a target object through an RF signal, the apparatus comprising:
   two loop antennas receiving the RF signal transmitted from the target object and coupled perpendicularly to each other; and
   a position and direction determination part calculating two RF signal intensities respectively received through the respective two loop antennas for comparison, and then determining that the target object transmitting an RF signal is placed in a center direction between the two loop antennas if the two RF signal intensities are the same, and determining that the target object is placed in a front direction of the loop antenna having a relatively higher RF signal intensity if the two RF signal intensities are different, wherein the position and the direction determination part calculates intensities $V_1$ and $V_2$ of two RF signals received through the respective antennas according to Equation 1, and then calculates an RF signal intensity ratio $V_{1,2}$ according to Equations, $$V_1 \propto C_1 S_1 B_1 |\sin(\theta_R - \phi)|$$

$$V_2 \propto C_2 S_2 B_2 |\sin(90° - (\theta_R - \phi))| \qquad \text{Equation 1}$$

where $C_1$ and $C_2$ represent a constant of the first loop antenna and a constant of the second loop antenna, respectively, $S_1$ and $S_2$ represent the size of the first loop antenna and the size of the second loop antenna, respectively, $B_1$ represents electric flux density passing through the first loop antenna, $B_2$ represents electric flux density passing through the second loop antenna, $\theta_R$ represents an angle of a rotation axis with respect to the reference axis, and $\phi$ represents an angle of the first loop antenna with respect to the reference axis.

$$V_{1,2} \propto \frac{V_1}{V_2} = |\tan(\theta - \phi)|. \qquad \text{Equation 2}$$

3. The apparatus of claim 2, wherein each of the two antennas is a plate-shaped loop antenna.

4. The apparatus of claim 2, wherein the reference axis is set perpendicular to a transmission direction of the RF signal, and the rotation axis is spaced apart from the two loop antennas and has the same angle with respect to the two loop antennas.

5. The apparatus of claim 2, wherein the position and direction determination part determines a position of the target object by calculating an angle $\phi$ of the first antenna with respect to the reference axis on the basis of the RF signal intensity ratio $V_{1,2}$ according to Equation below.

$\phi = \tan^{-1}(V_{1,2}) - \theta$

6. A method for tracing position and direction of a target object through an RF signal, the method comprising:
  rotating an antenna to receive an RF signal transmitted from the target object;
  calculating an intensity of the RF signal; and
  monitoring a fluctuation of the RF signal intensity and determining that the target object transmitting the RF signal is placed in front of the antenna when the RF signal intensity reaches the maximum,
  wherein the antenna is a plate-shaped loop antenna,
  wherein the calculating of the intensity comprises calculating the RF signal intensity V according to Equation below, $V \propto CSB|\sin(\theta)|$ where C, S, and B represent a constant of a loop antenna, the size of the loop antenna, and electric flux density of an RF signal passing through the loop antenna, respectively, and $\theta$ represents an angle between a front direction of the loop antenna and a transmission direction of the RF signal.

7. A method for tracing position and direction of a target object through an RF signal, the method comprising:
  receiving an RF signal transmitted from the target object through each of two perpendicularly-coupled antennas;
  calculating intensities of the RF signals received through the respective two antennas; and
  comparing the two RF signal intensities to determine that the target object transmitting the RF signal is placed in a center direction between the two loop antennas if the two RF signal intensities are the same, and determine that the target object is placed in a front direction of the loop antenna having a relatively higher RF signal intensity if the two RF signal intensities are different, wherein the calculating of the intensity comprises calculating the two RF signal intensities $V_1$ and $V_2$, respectively, according to Equation below $V_1 \propto C_1 S_1 B_1 |\sin(\theta_R - \phi)|$ $V_2 \propto C_2 S_2 B_2 |\sin(90° - (\theta_R - \phi))|$ where $C_1$ and $C_2$ represent a constant of the first loop antenna and a constant of the second loop antenna, respectively, $S_1$ and $S_2$ represent the size of the first loop antenna and the size of the second loop antenna, respectively, $B_1$ represents electric flux density passing through the first loop antenna, $B_2$ represents electric flux density passing through the second loop antenna, $\theta_R$ represents an angle of a rotation axis with respect to the reference axis, and $\phi$ represents an angle of the first loop antenna with respect to the reference axis,
  wherein the determining of the position of the target object comprises calculating an RF signal intensity ratio $V_{1,2}$ according to Equation below $$V_{1,2} \propto \frac{V_1}{V_2} = |\tan(\theta - \phi)|.$$

8. The method of claim 7, wherein the reference axis is set perpendicular to a transmission direction of the RF signal and the rotation axis is spaced apart from the two loop antennas and has the same angle with respect to the two loop antennas.

9. The method of claim 7, further comprising the determining of the position of the target object by calculating an angle $\phi$ of the first antenna with respect to the reference axis on the basis of the RF signal intensity ratio $V_{1,2}$ according to Equation below.

$\phi = \tan^{-1}(V_{1,2}) - \theta$

* * * * *